US007464391B2

(12) United States Patent
Yasuda et al.

(10) Patent No.: US 7,464,391 B2
(45) Date of Patent: Dec. 9, 2008

(54) OPTICAL RECORDING MEDIUM (75) Inventors: Kouichi Yasuda, Tokyo (JP); Mitsuaki Oyamada, Kanagawa (JP); Jun Nakano, Tokyo (JP); Norio Mitsui, Kanagawa (JP); Sakuya Tamada, Tokyo (JP)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 10/547,199

(22) PCT Filed: Mar. 10, 2004

(86) PCT No.: PCT/JP2004/003116

§ 371 (c)(1),
(2), (4) Date: Jan. 30, 2007

(87) PCT Pub. No.: WO2004/080724

PCT Pub. Date: Sep. 23, 2004

(65) Prior Publication Data

US 2007/0141294 A1    Jun. 21, 2007

(30) Foreign Application Priority Data

Mar. 13, 2003    (JP) ............................. 2003-068772

(51) Int. Cl.
*G11B 7/24*    (2006.01)
*B32B 3/02*    (2006.01)
(52) U.S. Cl. ..................................... 720/719; 428/64.4
(58) Field of Classification Search ............... 428/64.4, 428/163, 332; 430/270.12; 720/719
See application file for complete search history.

(56) References Cited

U.S. PATENT DOCUMENTS

| | | | | |
|---|---|---|---|---|
| 5,614,287 A * | 3/1997 | Sekiya et al. | ............... | 428/163 |
| 5,665,468 A * | 9/1997 | Sekiya et al. | ............... | 428/332 |
| 5,786,078 A * | 7/1998 | Sekiya et al. | ............... | 428/332 |
| 6,432,502 B1 | 8/2002 | Kitaura et al. | | |
| 2004/0157158 A1 * | 8/2004 | Kakiuchi et al. | ........ | 430/270.12 |
| 2006/0246251 A1 * | 11/2006 | Suda | ......................... | 428/64.4 |

FOREIGN PATENT DOCUMENTS

| | | |
|---|---|---|
| CA | 2 459 838 | 1/2004 |
| EP | 0 527 454 | 2/1993 |
| EP | 1 102 252 | 5/2001 |
| JP | 60-131650 | 7/1985 |
| JP | 61-031288 | 2/1986 |

(Continued)

*Primary Examiner*—Tianjie Chen
(74) *Attorney, Agent, or Firm*—Rockey, Depke & Lyons, LLC; Robert J. Depke (57) ABSTRACT

An optical recording medium using Sn as the recording material to improve the jitter is provided, in which on the surface of a disc substrate 11 where a concave and convex shape dividing a track area is formed, are formed on the surface of the concave and convex shape a first protective layer 31 for protecting at least an optical recording layer 31, an optical recording layer 12 using a chemical compound at least composed of tin (Sn), nitrogen (N) and oxygen (O), formed on the first protective layer, a second protective layer 32 for protecting this optical recording layer, formed on this optical recording layer, and a light-transmittable layer 13 formed on the second protective layer; with this structure, the optical recording layer 12 under high temperature and high humidity can be stabilized by means of the first and second protective layers 31 and 32.

7 Claims, 4 Drawing Sheets

FOREIGN PATENT DOCUMENTS

| | | |
|---|---|---|
| JP | 05-212967 | 8/1993 |
| JP | 06-052578 | 2/1994 |
| JP | 07-161072 | 6/1995 |
| JP | 10-334511 | 12/1998 |
| JP | 2001-273673 | 10/2001 |
| JP | 2002-269855 | 9/2002 |
| JP | 2004-090610 | 3/2004 |
| WO | WO2004/005041 | 1/2004 |

\* cited by examiner

OPTICAL RECORDING MEDIUM

This application claims priority to Japanese Patent Application Number JP2003-068772, filed Mar. 13, 2003 which is incorporated herein by reference.

TECHNICAL FIELD

The present invention relates to an optical recording medium, particularly to an optical recording medium capable of high density recording, in which jitter and deterioration of the recording characteristic under high temperature and high humidity are improved.

BACKGROUND ART

In recent years, an optical information recording system has widely been studied and developed in the field of information recording.

The optical information recording system has a number of advantages such as can deal with various memory types of non-contact type recording and reproduction, reproduction-only type, write-once type, and rewritable type; and therefore, from industrial use to consumer use, it is contemplated as a system capable of obtaining an inexpensive large-capacity file.

A large capacity of these various optical recording media for the optical information recording system, for example, an optical disc, has been accomplished mainly by making a wavelength of a laser beam, which is a light source used for the optical information recording system, short, as well as by using an objective lens having a high numerical aperture (N.A.) to make a spot size on a focal plane small.

For example, CD (Compact Disc) has a capacity of 650 MB when a wavelength of a laser beam is 780 nm and a numerical aperture (N.A.) of an objective lens is 0.45, whereas DVD-ROM (Digital Versatile Disc—Read Only Memory) has a capacity of 4.7 GB when a wavelength of a laser beam is 650 nm and a N.A. of an objective lens is 0.6.

Further, in an optical disc system of the next generation, by using an optical disc having a thin light-transmittable layer with a film thickness of, for example, approximately 0.1 mm formed on the optical recording layer, applying a laser beam from the side of the light-transmittable layer, and making a wavelength of a laser beam 450 nm or less and making N.A. 0.78 or more, a large capacity of 22 GB or more is made to be possible.

Figure 4:
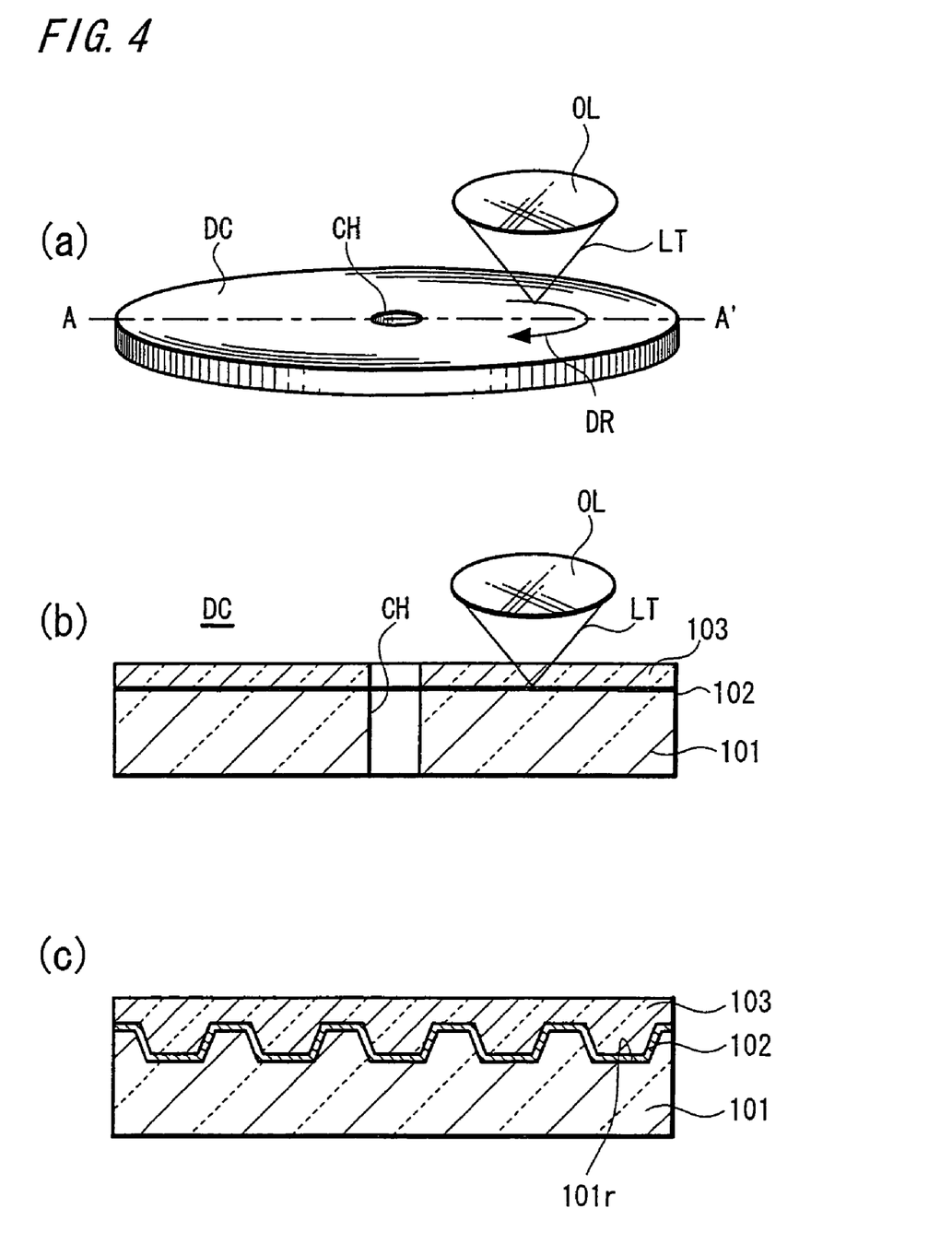
FIG. 4A is a schematic perspective view showing a state in which light is applied to a conventional optical disc.
FIG. 4B is a schematic section taken along a line A-A' in FIG. 4A.
FIG. 4C is an enlarged section of the relevant part.

FIG. 4A is a schematic perspective view showing a state of optical recording or optical reproduction with respect to the optical disc.

An optical disc DC is a disc having a center hole CH bored in the center and is driven to rotate in the direction, for example, shown by an arrow mark DR in FIG. 4A.

FIG. 4B is a schematic section of the optical disc DC. FIG. 4C is an enlarged section of a relevant part of the optical disc DC.

This optical disc has the structure in which a concave portion 101r is formed on the main surface of a disc substrate 101 made of, for example, polycarbonate resin having a thickness of about 1.1 mm, and an optical recording layer 102 is formed along a concave and convex surface including the concave portion 101r.

For example, in an optical disc DC of phase-change type, the optical recording layer 102 is made of a laminate of, for example, a dielectric film, a phase-change film, a dielectric film, a reflective film, and so on. Further, on the optical recording layer 102 is formed a light-transmittable layer 103 having a film thickness of, for example, 0.1 mm.

When information is recorded in or reproduced from the optical disc DC, light LT by a laser beam having a wavelength of 450 nm or less, for example, 380 nm to 420 nm is focused and applied to the optical recording layer 102 from the side of the light-transmittable layer 103 of the optical disc DC through an objective lens OL having a numerical aperture of 0.78 or more, for example, 0.85.

When the recorded information is reproduced, returned light reflected at the optical recording layer 102 is received by a light-receiving element and a signal-processing circuit generates a predetermined signal to provide a reproduced signal.

The optical recording layer 102 of this optical disc has a concave and convex shape resulted from the above-described concave portion 101r formed on the surface of the disc substrate 101.

The concave portion 101r forms, for example, a spiral continuous groove or grooves of concentric circles with a predetermined pitch, and with this concave and convex shape, a track area is divided.

The concave portion and convex portion of the concave and convex shape dividing the track area are called groove and land, respectively. When a land-groove recording method for recording information in both of the land and groove is employed, the large capacity can be obtained. However, only one of the land and groove can be made into a recording area.

In addition, for example, by making the concave and convex shape caused by the concave portion 101r formed on the disc substrate 101 into pits each having a length corresponding to recording data, a read-only-memory (ROM) type optical disc can be obtained.

It has been verified that tin oxide ($SnO_z$, $z<2$) which is a metal oxide with non-stoichiometric composition can be employed as a recording material forming the optical recording layer (See Journal of Materials Science Letters 19, 2000. 1833-1835).

However, in this case, when information is recorded using an objective lens having a numerical aperture of about 0.8 and a laser beam having a short wavelength of about 380 nm-420 nm, such a problem is posed that no recording mark in a satisfactory shape is formed and the jitter increases.

DISCLOSURE OF INVENTION

In order to solve this problem, the applicant of the present invention previously proposed in Patent Application No. 2003-17877 an optical recording medium capable of improving the above-described jitter and stabilizing the recording characteristic even under high temperature and high humidity, in the case where Sn is used for the optical recording layer.

In this application, a chemical compound made of tin (Sn), nitrogen (N) and oxygen (O) with non-stoichiometric composition is used for the optical recording layer, and it is considered to utilize the fact that optical constants are changed by oxidative reaction caused when irradiated with light such as a laser beam.

However, when the chemical compound made of tin (Sn), nitrogen (N) and oxygen (O) with non-stoichiometric composition is used for the recording material as described above, the recording characteristic under high temperature and high humidity is not necessarily stabilized sufficiently.

The present invention provides an optical recording medium capable of suppressing the jitter to enable a satisfactory recording to be performed even when light such as a laser beam of a short wavelength is applied through an objective lens of a high numerical aperture to record information, and further of maintaining a stable and excellent recording characteristic under high temperature and high humidity.

Specifically, the optical recording medium according to the present invention has the structure in which, on the surface of a substrate where a concave and convex shape dividing the track area is formed thereon, a first protective layer for protecting at least an optical recording layer, an optical recording layer using a chemical compound made of at least tin (Sn), nitrogen (N) and oxygen (O), formed on the first protective layer, a second protective layer for protecting the optical recording layer, formed on the optical recording layer, and a light-transmittable layer formed on the second protective layer are provided.

As described above, the optical recording layer is made of a chemical compound SnxNyOz (x, y, z: atomic %) made of at least tin (Sn), nitrogen (N) and oxygen (O), where x, y, z are selected to be 30<x<70 (atomic %), 1<y<20 (atomic %), 20<z<60 (atomic %).

The first protective layer can be made of tin oxide and the second protective layer can be made of silicon oxide.

According to the above-described structure of the present invention, the deterioration of the recording characteristic can be improved well even under high temperature and high humidity. It is assumed that because the optical recording layer made of tin (Sn), nitrogen (N) and oxygen (O) is held between the first and second protective layers, a change in oxygen concentration of the optical recording layer under high temperature and high humidity can be suppressed.

BEST MODE FOR CARRYING OUT THE INVENTION

An embodiment of an optical recording medium (optical disc) according to the present invention will be described below. However, the present invention is not limited to that embodiment.

Figure 1:
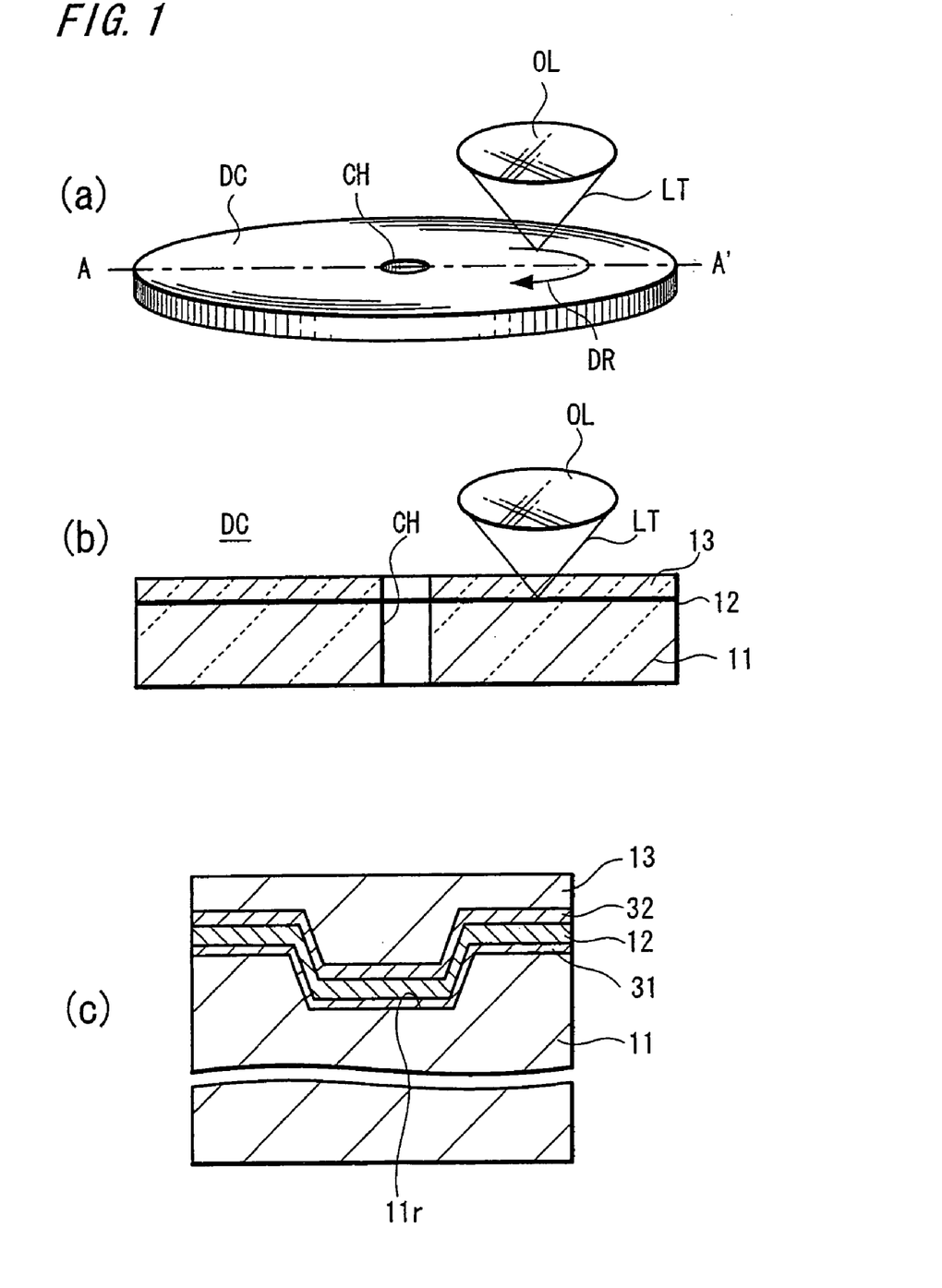
FIG. 1A is a schematic perspective view showing a state in which light is applied to an optical disc according to an embodiment of the present invention.
FIG. 1B is a schematic section taken along a line A-A' in FIG. 1A.
FIG. 1C is an enlarged section of the relevant part.

FIG. 1A is a schematic perspective view showing a state of optical recording or optical reproduction with respect to an optical disc DC according to this embodiment.

The optical disc DC is a disc having a center hole CH bored therein and is driven to rotate in a direction, for example, shown by an arrow mark DR.

FIG. 1B is a schematic section of the optical disc DC and FIG. 1C is an enlarged section of the relevant part in FIG. 1B.

As described above, the optical disc DC is a disc having the center hole CH and a concave portion 11r provided on one main surface of a disc substrate 11 made of, for example, polycarbonate resin having a thickness of about 1.1 mm. Along the concave and convex shape including the concave portion 11r is formed a first protective layer 31, on which an optical recording layer 12 is formed. On the optical recording layer 12 is formed a second protective layer 32, on which a light-transmittable layer 13 is formed.

The first and second protective layers 31 and 32 are provided to protect the optical recording layer 12 disposed therebetween; and these first and second protective layers 31, 32 and optical recording layer 12 are each selected to have a thickness between the range of 10 nm and 200 nm, for example, 50 nm to 60 nm or so.

The optical recording layer 12 is made of a chemical compound composed of at least tin (Sn), nitrogen (N) and oxygen (O) with composition SnxNyOz (x, y, z: atomic %), where x, y, z are selected to be 30<x<70 (atomic %), 1<y<20 (atomic %), 20<x<60 (atomic %).

Alternatively, the optical recording layer 12 is made of a chemical composition (SnxNyOz)1-aPda (x, y, z, a: atomic %) in which palladium (Pd) is contained in the chemical compound composed of tin (Sn), nitrogen (N) and oxygen (O), where x, y, z, a are selected to be 30<x<70 (atomic %), 1<y<20 (atomic %), 20<z<60 (atomic %) and 1<a<20 (atomic %).

With the above composition, jitter will be improved. Particularly, by adding Pd, characteristics were stabilized. It is conceivable that adding Pd increases viscosity of the recording film melted at the time of recording.

The optical recording layer 12 can be made to have a film thickness between 10 nm and 200 nm, for example, 30 nm to 60 nm or so.

It is preferable that the first protective layer 31 is made of tin oxide ($SnO_2$). It was recognized that if the first protective layer 31 is made of $SiO_2$, then the air-tightness becomes too high to make a satisfactory recording, because oxidative reaction at the time of recording is obstructed. In contrast, when the first protective layer 31 is made of tin oxide ($SnO_2$), a change in oxygen concentration of the optical recording layer 12 under high temperature and high humidity was suppressed without causing degradation of the recording characteristic, thus allowing the deterioration of the recording characteristic to be suppressed.

Further, it is preferable that the second protective layer 32 is made of $SiO_2$. If the second protective layer 32 is made of $SnO_2$ or $Si_3N_4$, when the film thickness increases, the reflectance decreases under the influence of combination of optical constants. In contrast, when the second protective layer 32 is made of $SiO_2$, because it has the optical constants close to that of the light-transmittable layer 13 thereon, even if the film thickness increases, the reflectance remains unchanged.

The light-transmittable layer 13 on the second protective layer 32 has a film thickness of, for example, 0.1 mm and is formed, for example, by hardening a coated film of ultraviolet-curing resin. Alternatively, the layer may be formed, for example, by sticking a film of light-transmittable resin such as a polycarbonate resin having an adhesive layer laminated thereon to the protective layer 32 by means of the adhesive layer.

Recording or reproduction of information with respect to the optical disc DC in this embodiment is performed by driving the optical disc DC to rotate in a direction, for example, indicated by an arrow mark in FIG. 1A, and focusing and applying a laser beam LT having a wavelength of, for example, 380 nm to 420 nm to the optical recording layer 12 of the optical disc DC from the side of the light-transmittable layer 13 through an objective lens OL having a numerical aperture of, for example, 0.85±0.05.

At the time of recording on the optical disc, the optical recording layer 12 is irradiated with, for example, the above-described laser beam LT to form a recording mark at the light-irradiated portion. It is assumed that this recording mark is formed because oxidative reaction is caused by the irradiation with the laser beam LT to change optical constants of the light-irradiated portion of the optical recording layer 12.

At the time of reproduction from the optical disc, for example, returned light modulated by the change in optical constants at the recording mark formed by irradiating the optical recording layer 12 is received by a light-receiving element, and a predetermined signal is generated by a signal-processing circuit to be taken out as a reproduced signal.

In this optical disc, the optical recording layer 12 has a concave and convex shape caused by the concave portion 11r formed on the surface of the disc substrate 11.

For example, the concave portion 11r formed on the disc substrate 11 constitutes a spiral continuous groove or grooves of concentric circles with a predetermined pitch, and the track area is divided by this concave and convex shape.

The pitch (distance from the center of the concave portion to the center of the adjacent concave portion) of the continuous groove or concentric-circle grooves is made to be, for example, 0.32 µm or so.

The concave portion and convex portion forming the concave and convex shape dividing the track area are called a groove and land, respectively. By applying a land-groove recording method in which information is recorded in both of the land and groove, a large capacity can be obtained. However, only one of the land and groove can also be made to be a recording area.

The depth of the concave and convex shape is approximately several nm to 100 nm. For example, it can be set to 20 nm for a groove recording system and to 40 nm for the land-groove recording system.

Hereupon, in the case where the conventional optical recording layer without containing N is employed, it has been known from an X-ray diffraction experiment that a certain size of particles exist in the film. Because the particles contribute to a noise component when used as an optical disc, it is assumed that, when the numerical aperture of an objective lens increases and the wavelength of a laser beam is made short to obtain a large capacity as described above, the grain boundary affects the characteristic to make the jitter increase.

In contrast, it was verified that, because the optical disc according to the above embodiment of the present invention has employed the chemical compound at least composed of tin, nitrogen and oxygen, namely, nitrogen (N) is added thereto for the recording material, a peak in the x-ray diffraction vanished. This shows that the particles in the optical recording film become smaller in size.

In this way, when the particles become smaller in size, the particles affecting the noise component becomes smaller, and therefore, according to this optical disc, jitter can be suppressed even if the numerical aperture of an objective lens is made to increase and the wavelength of a laser beam is made short.

As to the composition of the chemical compound composed of tin (Sn), nitrogen (N) and oxygen (O) used in the optical recording layer of this optical disc, when a composition ratio x of tin (Sn) is 30<x<70 (atomic %), a composition ratio y of nitrogen (N) is made to be 1<y<20 (atomic %).

This is because, with 1 atomic % or less, an effectiveness of making particles small in size becomes smaller, and with 20 atomic % or more, a light-absorption coefficient of the optical recording layer falls to make large optical power required when bringing the temperature rise enough to change the optical constants at the time of light irradiation, that is, to make the sensitivity fall.

A composition ratio z of oxygen (O) in the above-described chemical compound is made to be 20<z<60 (atomic %).

This is because, with 20 atomic % or less, oxidation is insufficient at the time of light-irradiation and with 60 atomic % or more, a light-absorption coefficient of the optical recording layer falls to make large optical power required when bringing the temperature rise enough to change the optical constants at the time of light irradiation, that is, to make the sensitivity fall.

As described above, in the composition of $Sn_xN_yO_z$ of the chemical compound composed of tin (Sn), nitrogen (N) and oxygen (O) used for the optical recording layer according to the present invention, in the case where the compound containing nitrogen (N) is employed, the composition ratio x, y, z is made to be 30<x<70 (atomic %), 1<y<20 (atomic %), 20<z<60 (atomic %).

With this composition, an effectiveness of suppressing the jitter can further be obtained, even if the numerical aperture of an objective lens increases and the wavelength of a laser beam is made short.

Next, a method of manufacturing the optical disc according to this embodiment will be described.

Figure 2:
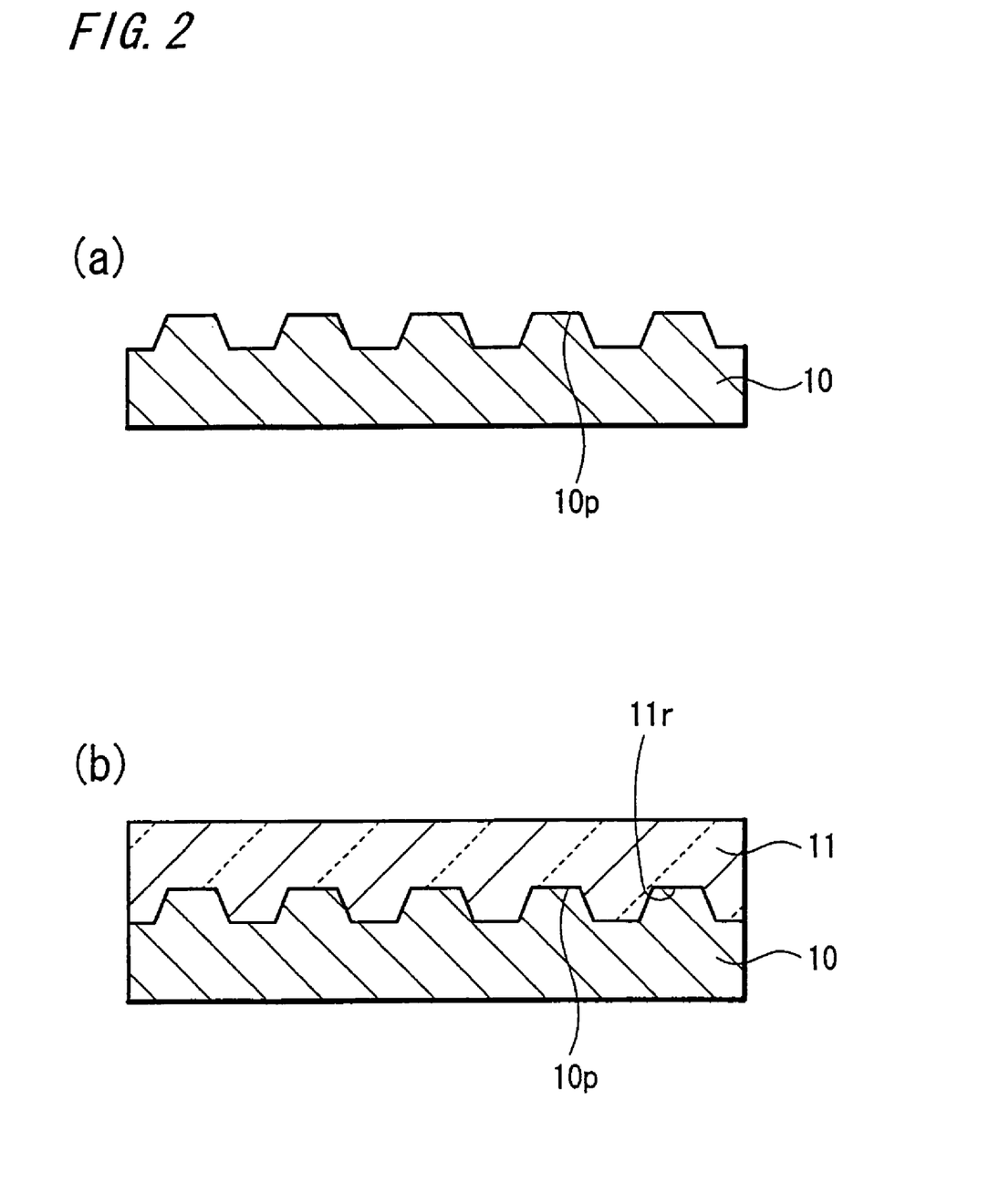
FIGS. 2A and 2B are sections each showing a step in a process of manufacturing the optical disc according to the embodiment.

First, as is shown in FIG. 2A, a stamper 10 to form the concave and convex shape on a disc substrate by transferring is formed. In other words, on the surface of the stamper 10 is formed a convex portion 10p which is an inverse pattern to the concave portion 11r on the disc substrate 11 shown in FIG. 1.

The stamper 10 can be manufactured by the following method.

First, for example, a positive type photoresist which becomes alkali-soluble when exposed to light is applied on a grinded smooth surface of a glass substrate by spin coating or the like. This photoresist layer is exposed with a pattern of a shape corresponding to the concave and convex shape to be formed on the disc substrate, such as the spiral shape or concentric-circle shape, and then the exposed photoresist layer is treated for development, for example, by an alkaline developing solution. From the thus patterned photoresist layer is obtained a master on which a resist film having the same pattern as that of the concave and convex shape on disc substrate is formed.

Next, on this master is deposited a metal layer of nickel or the like having a predetermined thickness by means of non-electrolytic plating and plating. After that, this metal layer is exfoliated from the master. In this way, the stamper 10 of a plated layer having an inverse concave and convex shape to the above-described concave and convex shape on the master is formed. Or the stamper 10 is manufactured by transferring from a master stamper or a mother stamper.

Next, the stamper 10 is disposed, for example, in a cavity of a stamping die for forming the disc substrate 11 by injection molding, and the injection molding is performed using, for example, polycarbonate (PC) resin. In this way, as is shown in FIG. 2B, the disc substrate 11 is formed on the concave and convex surface of the stamper 10.

Thus, there is molded the disc substrate 11 on the surface of which the pattern of the convex portion 10p on the stamper 10 is transferred to form the concave portion 11r, that is, to form the inverse pattern of the convex portion.

Figure 3:
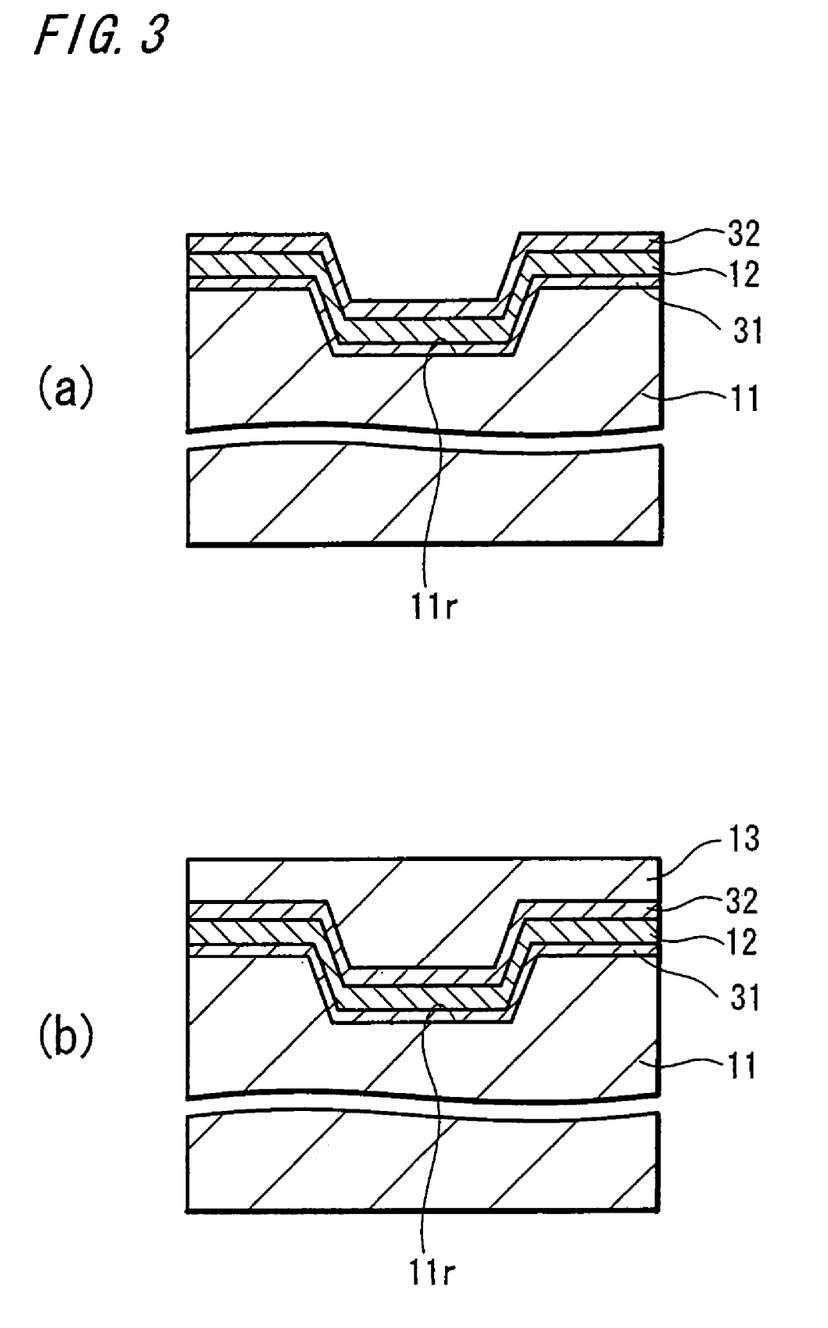
FIGS. 3A and 3B are process diagrams each showing a step in the embodiment of the present invention.

The disc substrate 11 thus molded is exfoliated from the stamper 10 and gas such as air or nitrogen gas is blown to the concave and convex surface to remove dust, and after that, as is shown in FIG. 3A, a first protective layer 31, an optical recording layer 12 where layers of chemical compound having a predetermined composition ratio of tin (Sn), nitrogen (N) and oxygen (O) are deposited, and a second protective layer 32 are formed into film, for example, by a spattering method.

Next, as is shown in FIG. 3B, a light-transmittable layer 13 is formed on the optical recording layer 12 by coating light-transmittable resin material such as ultraviolet-setting resin thereon to be cured, or by sticking a film of light-transmittable resin such as polycarbonate resin thereon by means of an adhesive layer.

In this way, the optical disc 11 having the structure shown in FIG. 1C can be manufactured.

According to the optical disc 11 of the present invention, when Sn is employed as the recording material, a change in the recording characteristic under high temperature and high humidity is avoided, and even when an objective lens of a high numerical aperture is employed to record information by a laser beam of a short wavelength, the jitter is suppressed to allow a satisfactory recording to be performed.

The above-described optical disc, that is, an optical recording medium according to the present invention will be described by citing the specific examples.

PRACTICE EXAMPLE 1

A disc substrate was prepared, on the surface of which the concave and convex shape dividing the track area was formed. The concave and convex shape was made as a spiral continuous groove with a 0.32 μm pitch, and the depth of the concave and convex shape was made to be 20 nm.

On the surface of the concave and convex shape thus formed on the disc substrate, the first protective layer 31 was formed by spattering $SnO_2$ with a thickness of 10 nm.

On the first protective layer 31 was deposited a composition $Sn_xNy_ox$ (x=31 atomic %, y=10 atomic %, z=59 atomic %) using a chemical compound composed of tin (Sn), nitrogen (N) and oxygen (O) to have the above composition ratio, with a film thickness of 50 nm to form an optical recording layer.

Further on that layer was deposited $SiO_2$ with a film thickness of 30 nm to form the second protective layer, and on that layer was formed a light-transmittable layer of 0.1 mm thickness by sticking a film of light-transmittable resin such as polycarbonate resin with an adhesive layer. In this way, a sample A of the optical disc was manufactured.

With respect to this sample A, a laser beam for recording and reproduction having an oscillation wavelength of 405 nm was applied through an objective lens with a numerical aperture of 0.85 to record a random signal with a bit length of 0.13 μm, using an estimation device having an optical system to focus light on the optical recording layer of the optical disc.

The jitter of a signal recorded on the optical disc at that time was 8%.

Further, after this optical disc was preserved at 80° C. and at 85% RH in a constant-temperature and constant-humidity bath for 500 hours, then the jitter was measured similarly to the above, the jitter was 8%, namely, no change was recognized.

COMPARISON EXAMPLE 1

A sample B of an optical disc was manufactured by excluding the step of forming the first protective layer 31 in the process of making the practice example 1.

A random signal having a bit length of 0.13 μm was recorded on this sample B using the same estimation device as in the practice example 1. The jitter at that time was 8%.

However, after the sample B was preserved at 80° C. and at 85% RH in the constant-temperature and constant-humidity bath for 500 hours, then the jitter was measured similarly to the above, the jitter was deteriorated to 14%.

Note that, typically, unless the jitter is 13% or less, a correct reproduction is difficult to be done; thus, the jitter is required to be 13% or less in an optical recording medium, for example, an optical disc.

PRACTICE EXAMPLE 2

In the composition $Sn_xN_yO_z$ of the optical recording layer 12 in the practice example 1, the composition ratio x, y, z was made to be x=69 atomic %, y=10 atomic %, z=21 atomic %.

In this optical disc also, no change in jitter was recognized under high temperature and high humidity.

PRACTICE EXAMPLE 3

Although the structure is the same as that of the practice example 1, the composition of the optical recording layer was changed into $Sn_xN_yO_z$ (x=45 atomic %, y=19 atomic %, z=36 atomic %) to manufacture a sample I of an optical disc.

In this optical disc also, no change in jitter was recognized under high temperature and high humidity.

While the above-described practice example has the optical recording layer 12 composed of $Sn_xN_yO_z$, if the optical recording layer 12 is composed of $Sn_xN_yO_z$ (30<x<70 (atomic %), 1<y<20 (atomic %), 20<z<60 (atomic %)) mixed with a refractory metal Pd of 1 atomic % to 20 atomic %, then it is possible to increase the viscosity when the optical recording layer is melted at the time of recording by irradiation with a laser beam, to improve a decrease in sharpness of a recording mark and a change in position due to arising fluidity, and to enhance further improvement in jitter and the preservation property.

In this case, the concentration of Pd added to the chemical compound made of tin (Sn), nitrogen (N) and oxygen (O) forming the optical recording layer is selected to be 1 atomic % to 20 atomic %. This is because, if it is less than 1 atomic %, the effectiveness in suppressing fluidity becomes small to make the improvement in the above-described preservation stability insufficient, and if it exceeds 20 atomic %, the melting point and thermal conductivity become large, so that the recording sensitivity decreases disadvantageously; for this reason, the concentration of Pd is selected to be 1 atomic % to 20 atomic %.

A practice example of an optical recording medium having the above-described optical recording layer mixed with Pd will be cited for description.

PRACTICE EXAMPLE 4

This practice example has the same structure as the practice example 1 except that the optical recording layer 12 is composed of $(Sn_xN_yO_z)_{1-a}Pd_a$ (x=31 atomic %, y=10 atomic %, z=59 atomic %, a=1 atomic %) by spattering.

PRACTICE EXAMPLE 5

This practice example has the same structure as the practice example 1 except that the optical recording layer 12 is composed of $(Sn_xN_yO_z)_{1-a}Pd_a$ (x=31 atomic %, y=10 atomic %, z=59 atomic %, a=20 atomic %).

These optical recording media in which Pd is mixed with the chemical compound composed of tin (Sn), nitrogen (N) and oxygen (O) made it possible to improve the jitter and enhance the tolerance to high temperature and high humidity.

In addition, the optical recording medium according to the present invention is not limited to the above-described embodiments and practice examples, and as a matter of course the present invention can take various modification and alteration in structure, such as taking the shape of an optical card, a sheet and a layered structure accompanied by the change or the like.

As described above, according to the optical recording medium of the present invention, in the case where tin is used as a recording material, when the first and second protective layers 31 and 32 are provided to improve the jitter, it is possible to suppress a change in concentration of oxygen under high temperature and high humidity, and so an effectiveness of avoiding the deterioration of recording characteristic can be obtained.

Therefore, according to the structure of the present invention, a great advantageous result of providing an optical recording medium having an excellent recording characteristic as well as a large capacity can be obtained.

The invention claimed is:

1. An optical recording medium including a substrate on the surface of which a concave and convex shape dividing a track area is formed, comprising on the surface of said concave and convex shape,
   a first protective layer for protecting at least an optical recording layer,
   the optical recording layer using a chemical compound at least composed of tin (Sn), nitrogen (N) and oxygen (O), formed on the first protective layer,
   a second protective layer for protecting the optical recording layer, formed on the optical recording layer, and
   a light-transmittable layer formed on the second protective layer.

2. An optical recording medium according to claim 1, wherein the first protective layer is made of tin oxide.

3. An optical recording medium according to claim 2, wherein the second protective layer is made of silicon oxide.

4. An optical recording medium according to claim 3, wherein the optical recording layer is made of a chemical compound composed of tin (Sn), nitrogen (N) and oxygen (O) with palladium (Pd) contained, whose composition is $(Sn_xN_yO_z)_{(1-a)}Pd_a$ 1-aPda (x, y, z, a: atomic %) where x, y, z, a are selected to be
30<x<70 (atomic %), 1<y<20 (atomic %), 20<z<60 (atomic %), and 1<a<20 (atomic %).

5. An optical recording medium according to claim 4, wherein at least one of recording and reproduction is performed on the optical recording layer through an objective lens having a numerical aperture of 0.85±0.05 with a laser beam having a wavelength of 380 nm to 420 nm.

6. An optical recording medium according to claim 3, wherein the optical recording layer is made of a chemical compound at least composed of tin (Sn), nitrogen (N) and Oxygen (O), whose composition is $Sn_xN_yO_z$ (x, y, z: atomic %) where x, y, z are selected to be
30<x<70 (atomic %), 1<y<20 (atomic %), and 20<z<60 (atomic %).

7. An optical recording medium according to claim 6, wherein at least one of recording and reproduction is performed on the optical recording layer through an objective lens having a numerical aperture of 0.85±0.05 with a laser beam having a wavelength of 380 nm to 420 nm.

* * * * *